United States Patent
Vezzani

[19]

[11] Patent Number: 6,146,493
[45] Date of Patent: *Nov. 14, 2000

[54] METHOD FOR THE CONCENTRATION OF LIQUID MIXTURES

[75] Inventor: Corrado Vezzani, Milan, Italy

[73] Assignee: Vomm Chemipharma S.R.L., Milan, Italy

[ * ] Notice: This patent issued on a continued prosecution application filed under 37 CFR 1.53(d), and is subject to the twenty year patent term provisions of 35 U.S.C. 154(a)(2).

[21] Appl. No.: 08/948,157

[22] Filed: Oct. 9, 1997

[51] Int. Cl.$^7$ .............................. B01D 1/22; F26B 7/00; A23L 1/0522

[52] U.S. Cl. .................... 159/49; 34/316; 99/348

[58] Field of Search .................. 159/6.1, 6.3, 49, 159/13.3; 127/19, 1; 210/360.1; 34/58, 315, 316; 99/348

[56] References Cited

U.S. PATENT DOCUMENTS

| | | | |
|---|---|---|---|
| 4,683,026 | 7/1987 | Feres | 159/6.1 |
| 5,256,250 | 10/1993 | Pelzer | 159/6.3 |
| 5,409,643 | 4/1995 | Vesszni | 264/8 |

FOREIGN PATENT DOCUMENTS

| | | |
|---|---|---|
| 0711505 A1 | 5/1996 | European Pat. Off. . |
| 0710670 A1 | 8/1996 | European Pat. Off. . |

OTHER PUBLICATIONS

Levenspiel, O., Chemical Reaction Engineering, 2d Edition, John Wiley & Sons, pp. 151–157, 1972.

*Primary Examiner*—Jacqueline V. Howard
*Assistant Examiner*—Frederick Varcoe, Jr.
*Attorney, Agent, or Firm*—Sughrue, Mion, Zinn, Macpeak & Seas, PLLC

[57] ABSTRACT

A method for the concentration of liquid mixtures, comprising the step of causing a continuous stream of the liquid mixtures to flow in the form of a turbulent thin layer in contact with a heated wall; for that purpose, a continuous stream of liquid mixture is fed into a turbo-concentrator comprising a cylindrical tubular body (1), a heating jacket (4) and a bladed rotor (8) rotatably supported in the cylindrical tubular body (1), and is centrifuged to form a dynamic and tubular thin layer, the thin layer advancing inside the cylindrical tubular body (1) then being discharged continuously in the form of a stream of concentrated liquid mixture.

4 Claims, 1 Drawing Sheet

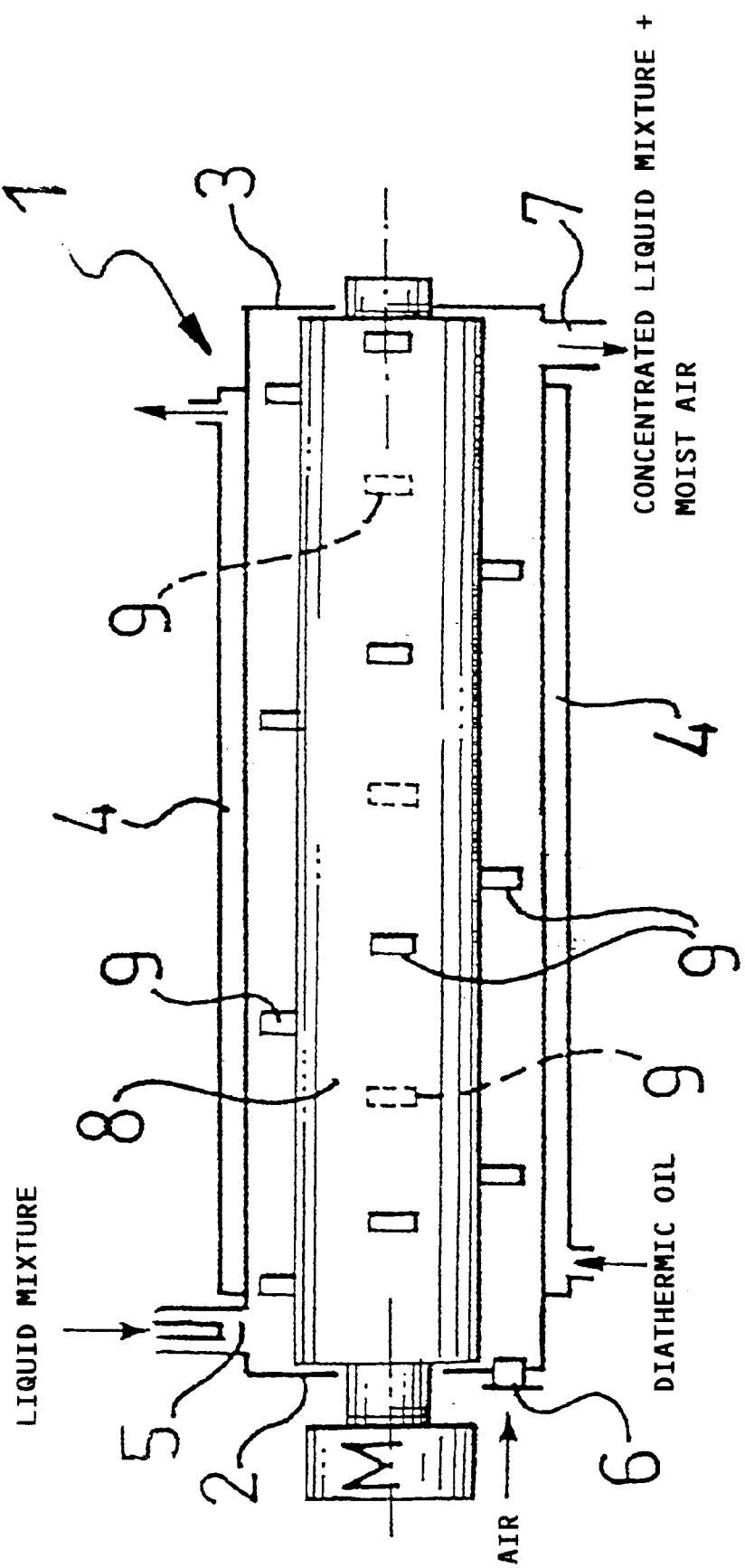

METHOD FOR THE CONCENTRATION OF LIQUID MIXTURES

FIELD OF THE INVENTION

The present invention relates, in its more general aspect, to the concentration of substantially liquid mixtures and solutions.

More especially, the invention relates to a method for the industrial concentration of substantially liquid mixtures and solutions within all industrial sectors, such as, for example, the food sector, and in the disposal of urban refuse, in purification plants, and in the recovery of heavy metals contained in aqueous solutions, etc..

Purely for the sake of simplicity, these substantially liquid mixtures and solutions will be referred to in the course of the description as liquid mixtures.

BACKGROUND OF THE INVENTION

The apparatuses chiefly used for the concentration of liquid mixtures include multiple-effect concentrators and vacuum concentrators.

The first type of technology comprises a series arrangement of two or more concentrators each comprising a container filled with the mixture to be concentrated, a coil heating device which is immersed in the liquid mixture and which is generally fed with steam, and finally a pipe system which connects in series the two or more containers constituting the plant. The liquid mixture in the first container is heated and concentrated by means of mains steam. After having reached a specific degree of concentration, the liquid mixture is conveyed into the next container where it is subjected to an analogous treatment, the only difference being that, in this case, the mains steam is replaced by the vapour coming from the first container, or that released from the liquid mixture in the first concentration stage. The process just described can be repeated several times until the desired concentration is obtained.

With this type of technology, however, it is possible to reach only a specific degree of concentration, which is determined by the viscosity of the product to be treated, because it is necessary to ensure that the product, which becomes gradually more dense, runs well from one container to another in the concentration plant in order to avoid undesired obstructions in the connecting pipe system. This problem is further aggravated if the liquid mixture to be treated contains various types of fibre, or aggregates of insoluble salts or the like. A further disadvantage presented by any type of liquid mixture to be treated, however, is that of the encrustations which form on the heating coils which have to be dismounted and cleaned periodically.

The second type of apparatus, the vacuum concentrators, normally comprise a container heated by a jacket or a heating coil, the latter being immersed in the liquid mixture to be treated, and a condenser for condensing the vapour formed in the concentration stage.

This type of apparatus, however, has the disadvantage of operating batchwise which, as is well known, limits productivity and requires more complex management operations. Added to this are the above-mentioned problems of the encrustations on the coils or other parts of the plant, and also a considerable waste of energy owing to the maintenance of reduced pressure in the plant.

SUMMARY OF THE INVENTION

The problem underlying the invention is to provide a method for the concentration of liquid mixtures of various kinds which avoids all the above-mentioned disadvantages.

The problem is solved, in accordance with the invention, by a method for the concentration of liquid mixtures, comprising the stage of causing a continuous stream of the liquid mixtures to flow in the form of a dynamic turbulent thin layer in contact with a heated wall.

The use of dynamic turbulent thin layers in contact with a heated wall has been found to be especially advantageous because it involves the formation of a large exchange surface, which substantially accelerates the processes of transporting mass and energy. Therefore, the use of thin layers enables the dimensions of the entire plant to be substantially reduced and the energy costs to be considerably decreased.

In a preferred embodiment of the present invention, a turbo-concentrator is used as the concentration unit. Of the machines of this type, that produced and marketed by the company VOMM-IMPIANTI E PROCESSI of Milan (Italy) has been found to be especially useful and advantageous. This machine basically comprises a cylindrical tubular body, having a horizontal axis and closed at the opposite ends, which is provided with openings for the introduction of a liquid mixture to be treated and a stream of dry air travelling in the same direction, a heating jacket for heating the internal wall of the tubular body to a predetermined temperature, and a bladed rotor rotatably supported in the cylindrical tubular body where it is rotated at a circumferential speed variable from 30 to 50 m/s.

With the use of a turbo-concentrator of the above-mentioned type, the method of the invention is characterised in that it comprises the stages of:

feeding a continuous stream of liquid mixture into the turbo-concentrator in which the bladed rotor is rotated at circumferential speeds variable from 30 to 50 m/s, centrifuging the liquid mixture to form a dynamic and tubular thin layer in which the liquid mixture is maintained in a state of high turbulence by the blades of the bladed rotor, advancing the dynamic and tubular thin layer to the discharge opening of the turbo-concentrator, causing it to flow substantially in contact with the heated wall of the latter to the discharge opening, discharging continuously a stream of concentrated liquid mixture.

The use of the method just described, because it is continuous, permits much higher productivity than do the batch or semi-batch techniques of the prior art. The use of an apparatus like that described above also substantially reduces the problems associated with the maintenance and the cleaning of the plant and thus the general management and production costs.

Advantageously, a stream of hot dry air is fed into the turbo-concentrator in the same direction as the stream of liquid mixture; thus, the speed at which vapour is removed is increased, which further reduces the residence times necessary for the stream in the concentration unit.

The above-mentioned stream of dry air preferably has a flow rate which may be up to 6 $Nm^3$ of air per liter of evaporated water.

A further embodiment of the invention provides, where appropriate, for the recycling of a portion of the discharged concentrated stream upstream of the turbo-concentrator; this increases the viscosity of the incoming stream, which facilitates the operation of the concentrator.

BRIEF DESCRIPTION OF THE FIGURES

FIG. 1 is a cutaway side view of the present invention showing a turbo-concentrator having a cylindrical tubular body closed at opposite ends and provided with a coaxial heating jacket through which a fluid flows.

DETAILED DESCRIPTION OF THE INVENTION

The characteristics and advantages of the invention will become clear from the following description of embodiments of the method described above which is given with reference to an apparatus shown diagrammatically in the single appended drawing, which is provided purely by way of illustration.

Referring to the above-mentioned drawing, an apparatus used for the method of concentration according to the invention comprises a turbo-concentrator formed basically by a cylindrical tubular body 1 which is closed at the opposite ends by bases 2, 3 and which is provided coaxially with a heating jacket 4 through which a fluid, for example diathermic oil, is to flow in order to maintain the internal wall of the body 1 at a predetermined temperature.

The tubular body 1 is provided with an opening 5 for the entry of the liquid mixture to be concentrated, an opening 6 for the stream of hot dry air, and also an opening 7 for the discharge of the concentrated liquid mixture.

A bladed rotor 8, the blades 9 of which are arranged helically and are orientated to centrifuge and simultaneously convey to the outlet the liquid mixture to be concentrated, is rotatably supported in the tubular body 1.

A motor M is provided to operate the bladed rotor at variable speeds.

EXAMPLE 1

A 35% solution of acetylated starch in acetic acid having a degree of acetylation equal to saturation was fed continuously into the turbo-concentrator described above at a flow rate of 100 kg/h. The internal wall of the turbo-concentrator was maintained at a temperature of 130° C. The bladed rotor, rotating at a circumferential speed of 40 m/s, centrifuged the liquid mixture against the wall of the turbo-concentrator where it formed a dynamic and turbulent tubular thin layer. After a residence time of 30 seconds, the stream of solution leaving the turbo-concentrator 1 was conveyed into a suitable storage unit (not shown). The solution so obtained had a concentration of 80%.

EXAMPLE 2

A solution of polypropylene carbonate in methylene chloride, having a solids content of 20%, was fed continuously at a flow rate of 100 kg/h into the turbo-concentrator described above, in the same direction as a stream of hot dry air having a flow rate of 500 m³/h. The temperature of the internal wall of the turbo-concentrator was 120° C., the circumferential speed of the bladed rotor was 40 m/s and the residence time in the turbo-concentrator was 1 minute. The stream leaving the turbo-concentrator, having a 90% solids content, was then discharged in the form of a molten mass and conveyed to a suitable storage unit.

EXAMPLE 3

A 75% solution of sorbitol in water was fed into the turbo-concentrator at a flow rate of 100 kg/h. The temperature of the internal wall of the turbo-concentrator 1 was 140° C., the circumferential speed of the bladed rotor was 40 m/s, while the residence time in the turbo-concentrator 1 was 2 minutes. The concentrated stream leaving the turbo-concentrator exhibited a 99% solids content.

EXAMPLE 4

A saline solution of dump effluent as such or coming from a membrane concentration plant with an average solids content of 2% was fed into the turbo-concentrator at a flow rate of 1000 kg/h. The temperature of the internal wall of the turbo-concentrator 1 was 240° C., the circumferential speed of the bladed rotor was 40 m/s, while the residence time in the turbo-concentrator 1 was 2 minutes. The concentrated stream leaving the turbo-concentrator exhibited a 50% solids content.

I claim:

1. A method for the concentration of solutions, comprising the steps of:

feeding a continuous stream of a solution into a turbo-concentrator comprising a cylindrical tubular body which has an internal wall, a horizontal axis and which is equipped with an opening for an introduction of the solution and with an opening for the discharge of a final product, a heating jacket for heating said internal wall of said tubular body to a predetermined temperature, and a bladed rotor rotatably supported in said cylindrical tubular body where said bladed rotor is rotated at circumferential speeds variable from 30 to 50 m/s, centrifuging the solution to form a dynamic and tubular thin layer in which the solution is maintained in a state of turbulence by the blades of said bladed rotor, advancing said dynamic and tubular thin layer to said discharge opening of the turbo-concentrator, causing said dynamic and tubular thin layer to flow substantially in contact with said heated internal wall to the discharge opening, and discharging continuously a stream of a concentrated solution.

2. The method according to claim 1, wherein a stream of a gas is fed into the turbo-concentrator such that the continuous stream of solution and gas flow in the same direction along a longitudinal axis of the turbo-concentrator.

3. The method according to claim 1, wherein at least a portion of the continuous stream of concentrated solution leaving the turbo-concentrator is recycled to the turbo-concentrator.

4. The method according to claim 2, wherein a portion of the continuous stream of concentrated solution leaving the turbo-concentrator is fed in again continuously upstream of the turbo-concentrator.

\* \* \* \* \*